May 18, 1965 R. A. REYNOLDS 3,184,670
CONTROL SYSTEM FOR REVERSING MOTOR ROTATION
Filed Sept. 5, 1961
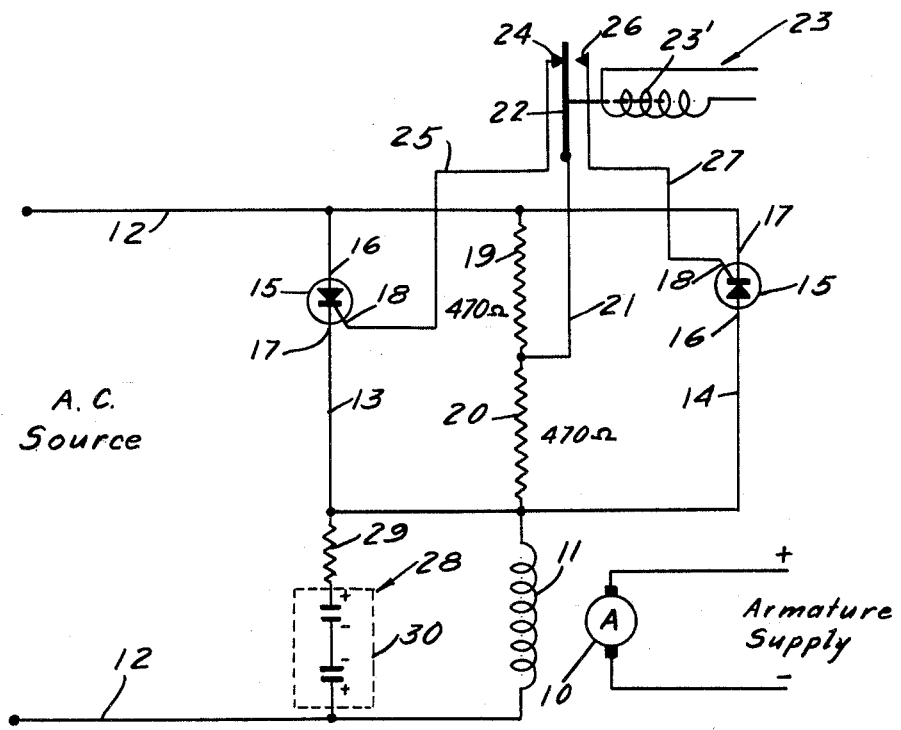
Rollin A. Reynolds,
INVENTOR.
BY Paul A. Weilein
Attorney 3,184,670
CONTROL SYSTEM FOR REVERSING MOTOR
ROTATION
Rollin A. Reynolds, Palos Verdes, Calif., assignor to
Dyna Systems Inc., Torrance, Calif., a corporation of
California
Filed Sept. 5, 1961, Ser. No. 136,090
4 Claims. (Cl. 318—300)

The present invention relates generally to a control system for an electric motor, and is more particularly concerned with means for reversing the direction of rotation of a direct current motor.

Heretofore, it has been a problem to properly utilize switching means for directly controlling the reversal of field energizing currents of relatively large direct current motors due to the induced current flow encountered with breaking the field circuit. The induced current flow during separation of the switch contacts burns the contacts and in general limits the life of the contactors.

With the foregoing in mind, the present invention has for an object the provision of an improved control system wherein the large field currents may be indirectly controlled without the use of conventional switch gear.

A further object is to provide an improved field reversing system utilizing gate controlled rectifiers.

Still another object is to provide in a field reversing system for D.C. motors, an R-C network connection across the field terminals, whereby the rate of time of deceleration and acceleration of the motor during reversals may be regulated.

Further objects of the invention will be brought out in the following part of the specification, wherein detailed description is for the purpose of fully disclosing the invention without placing limitations thereon.

In the accompanying drawing which is for illustrative purposes only, the single figure is a schematic wiring diagram of a control system for reversing the direction of rotation of a direct current motor according to the present invention.

Referring more specifically to the drawing, there is illustrated a control system for controlling the direction of rotation of a direct current electric motor which, in this case, comprises an armature winding 10 and a field winding 11 which is shown as being separately energized from an A.C. line voltage source 12.

More specifically, the field winding 11 has one terminal connected to one side of the line source, while the other terminal of the field is connected through parallel circuit conductors 13 and 14 to the other side of the line source, each of these circuit conductors containing an electronic switching device 15 therein such as commercially referred to as a silicone or solid state controlled rectifier. This device has in each case an anode electrode 16, a cathode electrode 17 and a control or gate electrode 18. The rectifiers 15 are connected in the circuit conductors 13 and 14 in reverse order so that when the current flows in a forward direction through one of these rectifiers it will energize the field with one polarity, and when it flows in a forward direction through the other rectifier it will energize the field with an opposite polarity.

Provision is made for selectively gating or firing the rectifiers 15 and this is acomplished by applying a positive gating voltage to the required rectifier to obtain the desired direction of motor rotation. Various means may be utilized to obtain the required positive gating potential. For example, as illustrated in the present embodiment, resistors 19 and 20 are series connected with the field winding 11 across the alternating current voltage source, and the junction between the resistors is connected by a conductor 21 with a movable contact 22 of an electric relay 23 having an actuating coil 23'.

As thus connected, the common junction between the resistors 19 and 20 will have a half-wave sign potential which varies from zero to a peak potential higher or in positive relationship to that of the negative side of the alternating voltage source. Also, it will be apparent that when the side of the A.C. source which is connected to the other terminal of resistor 20 is at positive potential, the common junction will be at a potential above that of the cathode electrode of one of the rectifiers 15, and that upon reversal of the A.C. source voltage, the potential at the common junction will be above that of the cathode electrode of the other rectifier 15.

The gating voltage is so chosen that the rectifier will fire early in each half-cycle, and will cut-off at zero or when reversal of the A.C. voltage occurs.

The relay is so arranged that, when the actuating coil is de-energized, the movable contact will be in engagement with a fixed contact 24 having a connection through conductor 25 with the gate electrode 18 of the rectifier in the circuit conductor 13. Upon energization of the coil 23', the movable contact 22 will be moved into engagement with a fixed contact 26 which is similarly connected through a conductor 27 with the gate electrode 18 of the rectifier in the circuit conductor 14. Thus, by energizing and de-energizing the actuating coil 23' of the relay, the positive gating voltage obtainable at the junction of the resistors 19 and 20, under reversed conditions of current flow therethrough, may be connected to the rectifier having proper polarity disposition so as to fire the rectifier and provide current flow in a proper direction through the field to give the direction of rotation of the motor desired.

A further feature of the control system of the present invention resides in the utilization of an R-C network 28 which is connected between the field winding terminals, this network being composed of a resistor 29 connected in series with a non-polarized capacitor 30. This network not only serves as a filter, but provides additional operating advantages. By the appropriate choice of values for these components, the rate of time of deceleration and acceleration during reversals of the motor rotation may be regulated so that such reversals may be accomplished in a smooth manner determined by the time it takes the capacitor to discharge and then recharge under the reversed field condition.

The R-C network as explained above further assures immediate cut-off of the rectifier 15, which is conducting, during reversals of the motor rotation. The motor field 11 being inductive normally tends to cause a continuation of current flow through the field when the motor rotation is reversed by changing rectifiers. By using an R-C network, a back electromotive force or potential is built up, which will function to cut-off current flow immediately upon reversals.

It will also be noted that during operation of the motor in a selected direction of rotation, the polarity of the charged capacitor 30 will be such that it will add to the rectified voltage of the A.C. source each time a change is made from one rectifier to the other, and that substantially double voltage will be applied to the rectifier. The resistor 29 being in circuit with the rectifiers provides a current limiting load and prevents damage to the rectifier during these reversal operations.

Various modifications may suggest themselves to those skilled in the art without departing from the spirit of my invention, and hence, I do not wish to be restricted to the specific form shown or uses mentioned except to the extent indicated in the appended claims.

I claim:

1. In a control system for reversing a direct current motor having an armature winding and a field winding, an alternating-current voltage source, resistor means connected in series with said field winding to said source, a pair of gate controlled rectifiers each having a control electrode, said rectifiers being connected in parallel inverse relation to each other and in parallel across said resistor means, and means for selectively connecting the control electrode of either rectifier with a point on said resistor having a positive gating potential when the field current is in a proper direction to pass through the selected rectifier in a forward direction.

2. In a control system for reversing a direct current motor having an armature winding and a field winding, an alternating-current voltage source, resistor means connected in series with said field winding to said source, a pair of gate controlled rectifiers each having a control electrode, said rectifiers being connected in parallel inverse relation to each other and in parallel with said resistor means, means for selectively connecting the control electrode of either rectifier with a point on said resistor having a positive gating potential when the field current is in a proper direction to pass through the selected rectifier in a forward direction, and an R-C network connected across said field winding.

3. In a control system for reversing a direct current motor having an armature winding and a field winding, an alternating-current voltage source, a pair of gate controlled rectifiers each having a control electrode, said rectifiers being connected in parallel inverse relation to each other and in series with said field winding to said source, a source of gating potential, means for selectively connecting the control electrode of either rectifier with said gating potential depending upon the direction of motor rotation desired, and an R-C network connected across said field winding including a non-polarized capacitor.

4. In a control system for reversing a direct current motor having an armature winding and a field winding, an alternating-current voltage source, a resistor connected in series with said field winding to said source, an R-C network containing a non-polarized capacitor connected across said field winding, a pair of gate controlled rectifiers each having a control electrode, said rectifiers being connected in inverse relation to each other and in parallel with said resistor, and means for selectively connecting the control electrode of either of said rectifiers to a mid-tap of said resistor for reversing direction of current flow through the field winding.

References Cited by the Examiner
UNITED STATES PATENTS

| | | | |
|---|---|---|---|
| 2,466,984 | 4/49 | Gilbert | 318—300 X |
| 2,722,649 | 11/55 | Immel et al. | |
| 3,024,401 | 3/62 | Dinger | 318—331 X |
| 3,103,618 | 9/63 | Slater. | |

OTHER REFERENCES

Publication—Seegmiller: Controlled Rectifiers Drive A-C and D-C Motors, Electronics, Nov. 13, 1959.

ORIS L. RADER, *Primary Examiner.*